United States Patent
Conway et al.

(10) Patent No.: US 6,865,308 B1
(45) Date of Patent: Mar. 8, 2005

(54) BACKSIDE DEPOSITION FOR RELIEVING STRESS AND DECREASING WARPING IN OPTICAL WAVEGUIDE PRODUCTION

(75) Inventors: Timothy J. Conway, Gainesville, VA (US); Thomas J. McIntyre, Nokesville, VA (US); Andrew T S Pomerene, Leesburg, VA (US)

(73) Assignee: BAE Systems Information and Electronic Systems Integration Inc., Nashua, NH (US)

(*) Notice: Subject to any disclaimer, the term of this patent is extended or adjusted under 35 U.S.C. 154(b) by 0 days.

(21) Appl. No.: 10/897,787

(22) Filed: Jul. 23, 2004

(51) Int. Cl.[7] .............................. G02B 6/12; H01L 21/00
(52) U.S. Cl. .................... 385/14; 385/129; 385/131; 438/31
(58) Field of Search .................... 385/14, 129, 130, 385/131; 438/29, 31

(56) References Cited

U.S. PATENT DOCUMENTS

| | | | | |
|---|---|---|---|---|
| 6,477,308 B2 | * | 11/2002 | Hattori et al. | ............... 385/129 |
| 6,501,896 B2 | * | 12/2002 | Nara et al. | .................. 385/129 |
| 2001/0041039 A1 | * | 11/2001 | Hattori et al. | ............... 385/129 |
| 2002/0064360 A1 | * | 5/2002 | Makikawa | ................... 385/130 |
| 2003/0021567 A1 | * | 1/2003 | Yoneda | ....................... 385/129 |
| 2003/0091263 A1 | * | 5/2003 | Yoneda | ....................... 385/14 |
| 2003/0095776 A1 | * | 5/2003 | Saito et al. | ................... 385/137 |

* cited by examiner

Primary Examiner—Brian M. Healy
(74) Attorney, Agent, or Firm—Daniel J. Long; Robert K. Tendler

(57) ABSTRACT

For those optical waveguides that require the deposition of a thick film and a high-temperature anneal to create an appropriate waveguide medium, wafer warping, bowing or dishing is reduced or eliminated by depositing a film of the same thickness on the backside of the wafer so as to relieve film stress during the deposition and annealing process. In one embodiment the waveguide medium is silicon oxynitride, although other depositable thick films may be utilized in place of the silicon oxynitride.

18 Claims, 5 Drawing Sheets

BACKSIDE DEPOSITION FOR RELIEVING STRESS AND DECREASING WARPING IN OPTICAL WAVEGUIDE PRODUCTION

FIELD OF THE INVENTION

This invention relates to a method for manufacturing optical waveguides and more particularly to a method for eliminating warping when a thick film used for the waveguide is deposited on a wafer and is annealed.

BACKGROUND OF THE INVENTION

Optical waveguides in general either are manufactured in the form of cladded optical fibers or in the form of optical material that is patterned onto a wafer so as to provide, for instance, an arrayed optical waveguide that is used in separating out different wavelengths. In such an application, incoming light is made to travel down through one waveguide section or another, depending on the wavelength of the incident light.

With respect to optical waveguides formed by layers deposited on a silicon wafer, the layers that are deposited are relatively thick and are annealed on the wafer using a relatively high temperature. In the process, the wafer becomes warped such that the wafer is bowed or dish-shaped. When one wants to use photolithography to pattern deposited layers, either the wafer is warped such that proper registration of the photolithography pattern cannot be obtained or, in extreme cases, the wafer itself is so warped that it cannot be properly secured to the vacuum chuck used by the stepper.

In either case where the photolithography does not provide the appropriate patterning of the waveguide on the wafer, or in the case where the entire wafer is rejected by the stepper, it is important to be able to find a technique that can successfully accommodate the deposition of a relatively thick 1.5 micron thickness of, for instance, silicon oxynitride, which forms the waveguide material on the wafer, and do this without inducing wafer distortions. If wafer warping is not appropriately controlled, either the waveguide will not function properly to provide total internal reflection or support TEM modes, or the wafers cannot be loaded into the stepper.

In order to maintain the tight tolerances required by optical waveguides formed on a wafer, one must first start with a flat wafer surface so that one can photoprocess across the whole wafer and still have all surfaces of the wafer be in the same focal plane.

In order to establish such a surface, the wafer is polished flat so that when it is transported to the fabrication section and processing is started to add levels or films to the wafer, the wafer surface must be flat. However, thermally-induced stress in the wafer causes the wafer to dish. The result is that the wafer is not as flat as it needs to be. Because of the stress-induced shape of the wafer, one obtains focus variations and critical dimension variations across the wafer. This in turn translates to waveguides that have critical dimensional errors.

It will be appreciated that the purpose of the waveguide is to provide total internal reflection of the incoming light so that it reflects down the waveguide and maintains the appropriate mode of propagation. While it is possible to glue optical fibers onto a wafer to provide an optical array, it is preferable to simply lay down an optically transparent film on the wafer and then etch structures in the wafer that constitute fiber-like waveguides. While the waveguides are square as opposed to round, assuming that the waveguides are properly made, they functioned equally as well as optical fibers.

If on the other hand there are refractive index changes from the stress-induced bowing process when a relatively thick later is annealed to a wafer, the critical dimensions of the waveguide can deleteriously affect the channeling of the light.

SUMMARY OF INVENTION

While optical waveguides require the deposition of a thick silicon oxynitride film and a high-temperature anneal to create the appropriate waveguide core, following the annealing process the wafers are severely warped, making it impossible to complete the required photolithography and etch steps that follow.

However, by depositing an equally thick silicon oxynitride film on the backside of the wafer, one is able to relieve the film stress. As a result, the warping is significantly reduced following the high-temperature anneal, making the follow-on processing steps possible.

Thus, while warping is a direct result of the use of the relatively thick films that are required for optical waveguides, on the order of, for instance, 1.5 microns, the subject system now makes it possible to accurately pattern and etch an array of waveguides onto a wafer using standard photolithography and etching techniques.

In one embodiment, the waveguide core material is silicon oxynitride, with the arrayed optical waveguide being fabricated as follows:

The first step is the polishing of a silicon wafer, onto which is deposited a thick layer of oxide that acts as a cladding. This layer of oxide is on the order of three microns thick and is deposited conventionally, without the requirement of an annealing step.

Next is deposited a layer of silicon oxynitride, both on top of the thick oxide layer and to the underside of the wafer, with the thickness of both of the silicon oxynitride layers being equal, and in one embodiment 1.5 microns, or 15,000 angstroms. Thereafter the silicon oxynitride layers are annealed to the wafer.

The resulting piece is then transported to a stepper for a photolithographic process in which a photo mask is formed, with a wafer, such as a six-inch wafer, being able to accommodate, for instance, 40 identical arrayed waveguides.

The result of the use of the stepper is to provide patterns for etching the channels into the silicon oxynitride top layer. The subsequent etching process leaves behind the individual square silicon oxynitride cores. After etching, a further thick layer of overcladding, usually of silicon dioxide, is deposited over the entire structure going over the cores and in between them, with the silicon dioxide overlayer forming a thick overcladding for the entire device.

Thus, the silicon oxynitride layer is that which is patterned by the etching to form the waveguide cores.

When the silicon oxynitride layer is deposited on the initial oxide cladding layer and is annealed, a compressive stress occurs within the wafer which pushes the middle of the wafer down and the edges up so that the wafer is slightly dish-shaped or bowed into a bowl shape.

In order to provide for sufficient stress relief, one likewise anneals the silicon nitride underlayer in the same fashion as the overlayer so as to cancel out the internal stresses to the wafer.

The result is that prior to being placed in the stepper, the topside of the silicon oxynitride layer is extremely flat, as is the bottom of the wafer, which may now be sucked down onto the vacuum chuck of the stepper, with the lack of warping both permitting proper mounting in the stepper and also proper patterning of the top surface.

In general, waveguides made in this manner are used as arrayed waveguides usable in the telephony industry to separate out different wavelength light. One such use is in a WDM multiplexer. The purpose of the optical waveguide array is to channel light that is split out by wavelength so that one can process information conveyed by the different wavelength light.

In summary, for those optical waveguides that require the deposition of a thick film and a high-temperature anneal to create an appropriate waveguide medium, wafer warping, bowing or dishing is reduced or eliminated by depositing a film of the same thickness on the backside of the wafer so as to relieve film stress during the deposition and annealing process. In one embodiment the waveguide medium is silicon oxynitride, although other depositable thick films may be utilized in place of the silicon oxynitride.

BRIEF DESCRIPTION OF THE DRAWINGS

These and other features of the subject invention will be better understood in connection with a Detailed Description, in conjunction with the Drawings, of which.

DETAILED DESCRIPTION

Figure 1:
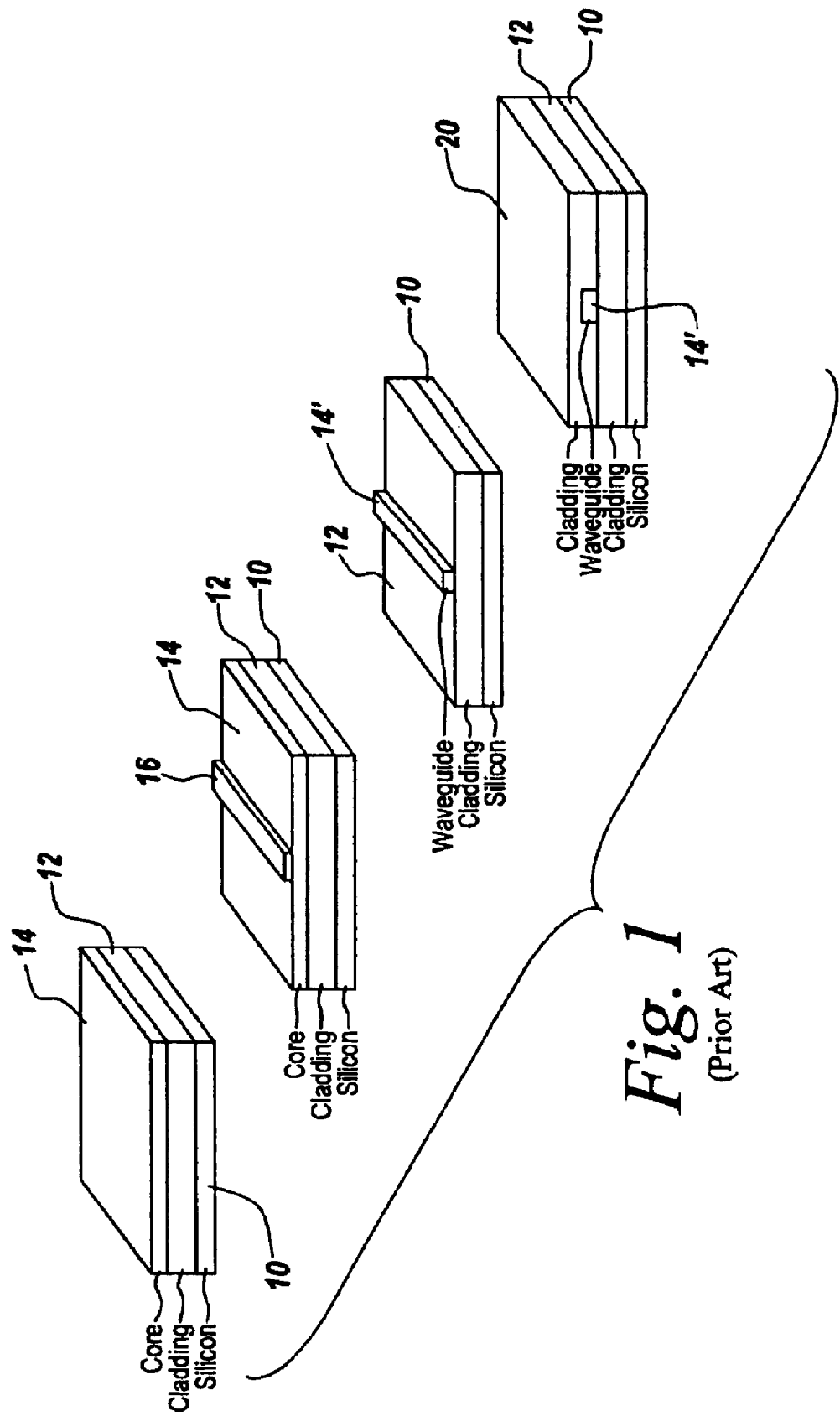
FIG. 1 is a diagrammatic illustration of a prior art fabrication process for waveguides.

Referring now to FIG. 1, in a traditional waveguide fabrication process, a silicon wafer 10 is overclad with a cladding layer 12 over which is deposited a layer of core 14. Thereafter, a metal mask 16 is formed over the core material, with the metal mask leaving a waveguide core 14' on top of cladding 12 after an etching step. The finished waveguide is provided by overcladding the structure, leaving the core with a further cladding layer 20, with core 14' surrounded by cladding, thus to form the appropriate waveguide structure.

Figure 2:
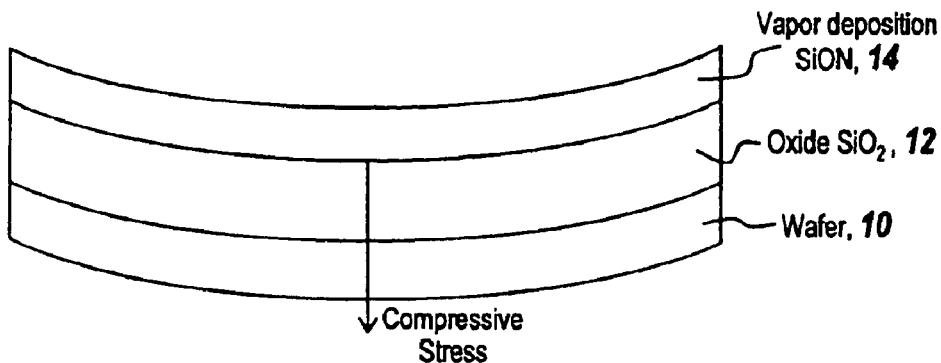
FIG. 2 is a diagrammatic illustration of the warping of a wafer when the waveguide core is annealed to the cladding over the top of a wafer.

However, as illustrated at FIG. 2, wafer 10, along with the cladding 12 as well as the vapor-deposited core 14, is bowed downwardly due to the compressive stresses that accompany the annealing of the vapor-deposited core layer.

As mentioned hereinbefore, the warping of the whole structure due to bowing or dishing is a result of the compressive stress that both distorts the waveguide shape due to focusing problems in the photolithographic process, and can prevent the wafer from being able to be vacuum-chucked into a stepper for the generation of the appropriate images.

Figure 3:
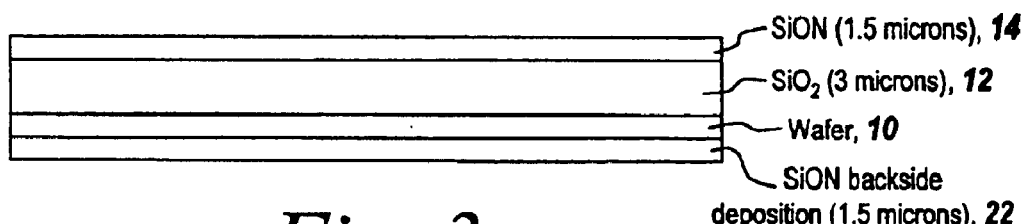
FIG. 3 is a diagrammatic illustration of the use of a backside deposition of the core material, in one instance silicon oxynitride, to prevent the warping of the wafer illustrated in FIG. 2.

In order to counteract the warping during annealing, and as illustrated in FIG. 3, simultaneous with the deposition of core 14 over cladding 12, a silicon oxynitride backside deposition 22 is applied over wafer 10, with the thickness of the backside deposition equaling that of the core.

Figure 4:
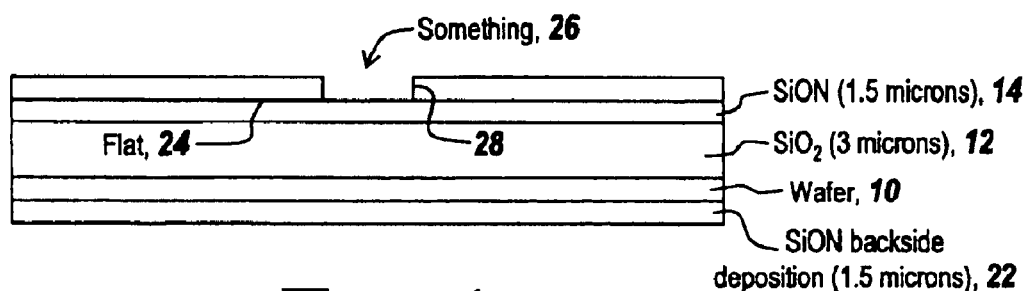
FIG. 4 is a diagrammatic illustration of the use of a photo mask and the depositing of a metal in the apertures of the mask to be able to pattern the core material, illustrating that the surface of the core material is flat due to the deposition of the backside layer prior to annealing.

The result, as illustrated in FIG. 4, is that one has a flat surface 24 on top of the silicon oxynitride layer 14, which enables the formation of an accurate photo mask. This in turn permits the accurate patterning into an aperture 28 in a photo mask 30.

Because a flat surface is presented in the stepper for the fabrication of photo mask 30, alignment and focusing problems are eliminated so that dimensional accuracy of the patterned core material is established.

Figure 5A:
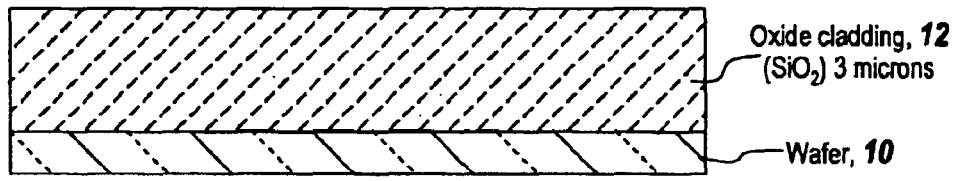
FIGS. 5A through 5D are sectional diagrams of the process for fabricating an optical waveguide array, illustrating the deposition of a backside layer at the same time as the deposition of the core material for the waveguide, also illustrating the finished product; and, FIG. 6 is a diagrammatic illustration of the utilization of an array waveguide in a WDM multiplexer.

In one embodiment, how this is accomplished is shown in FIGS. 5A–5D. In FIG. 5A, a silicon wafer 10 is provided with an oxide cladding $SiO_2$ layer 12, which in one embodiment is three microns in thickness.

Figure 5B:
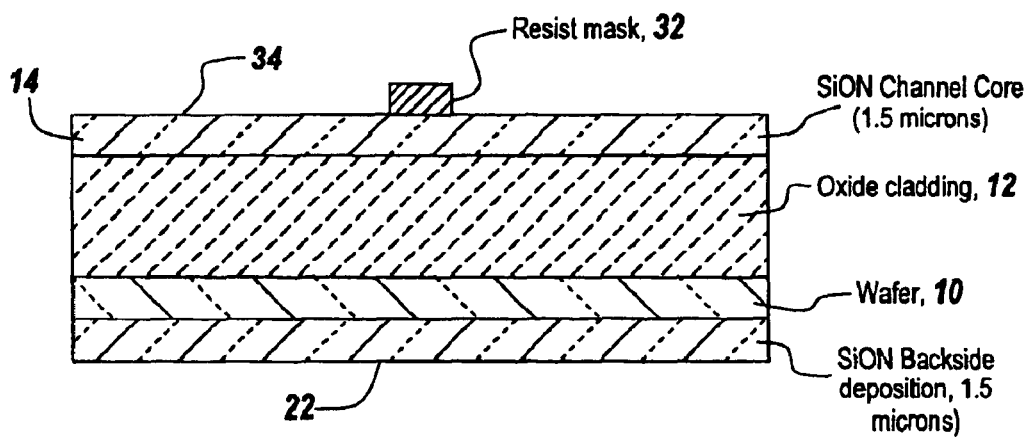

As illustrated in FIG. 5B, cladding layer 12 is overcoated with a 1.5-micron silicon oxynitride layer 14. Prior to annealing, a backside layer of silicon oxynitride 22 is deposited on the backside of wafer 10, again in one embodiment having a thickness of 1.5 microns to equal that of the core material on the top of cladding 12.

The article formed by the deposition of the core and backside material is annealed at 1100° C. for 120 minutes, with compressive stresses associated with the annealing of the core material being counterbalanced or counteracted by the stresses induced by annealing. Note that both layers are subjected to the same annealing temperature.

Figure 5C:
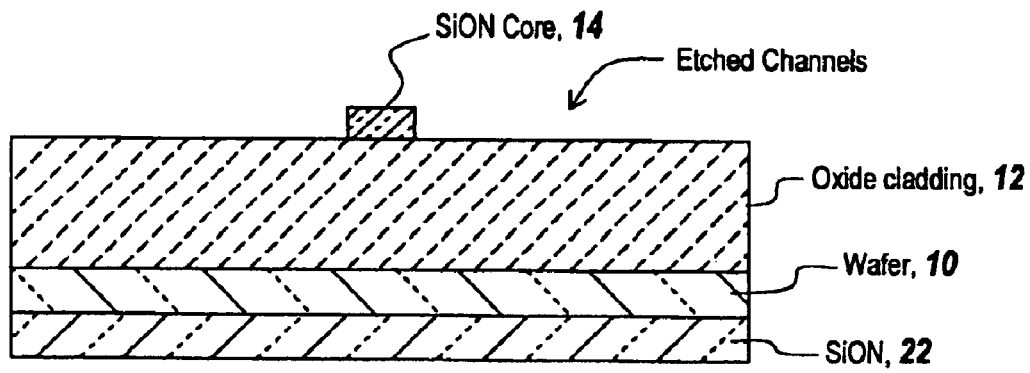

A photo mask 32 is then patterned on to the top surface 34 of the layer forming core 14, whereupon after an etching step and as illustrated in FIG. 5C, what is left on top of cladding 12 is silicon oxynitride core 14'.

Figure 5D:
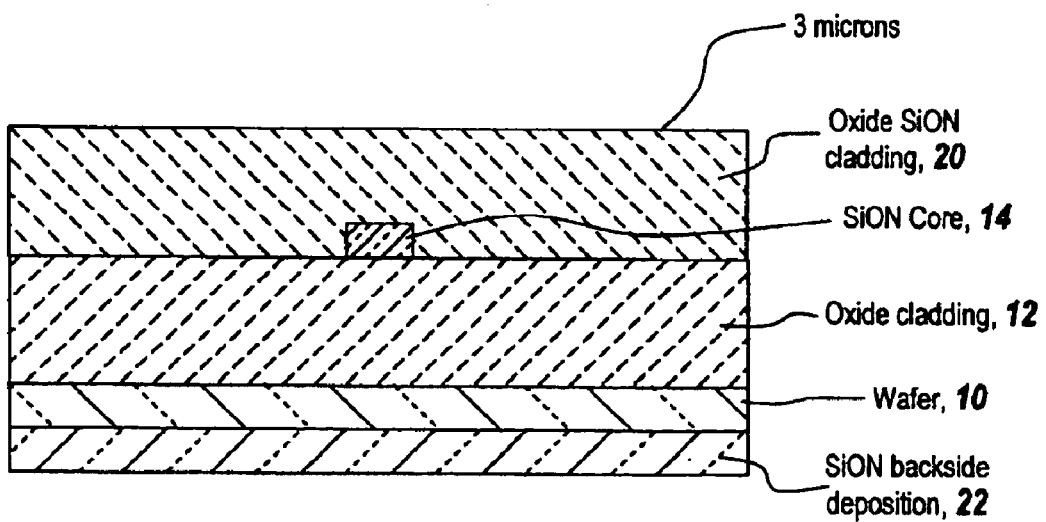

As seen in FIG. 5D, a three-micron layer of silicon oxide cladding 20 is deposited over the entire device so as to completely surround core 14', thus to complete the device.

Figure 6:
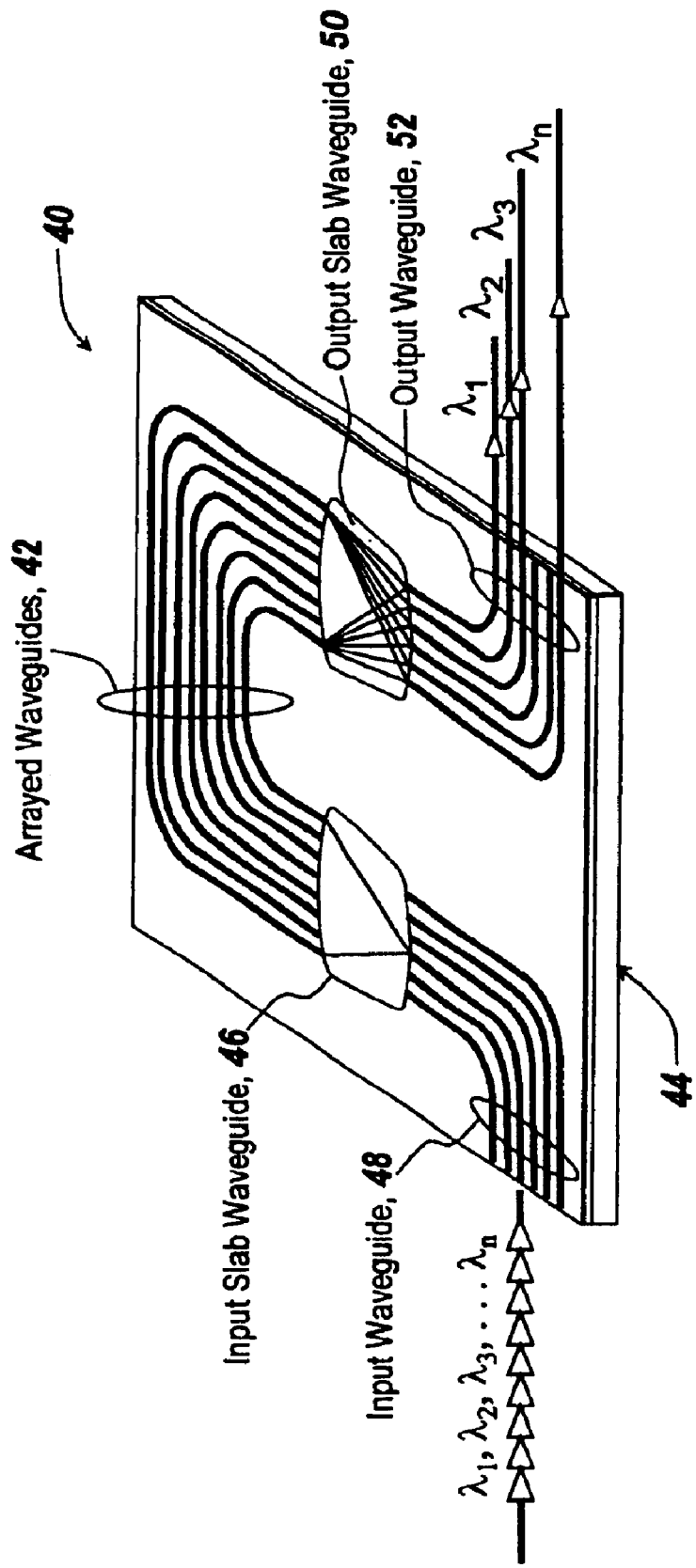

Optical waveguides formed in this manner may be arrayed as illustrated in FIG. 6, to provide an arrayed waveguide-based WDM demultiplexer 40. Here, arrayed waveguides 42 are formed in a structure 44 such as that described hereinbefore, with the input end of the waveguides being provided with an input slab waveguide 46 that is fed by input waveguides 48 having light of a number of wavelengths. The input slab directs the various wavelengths of light into separate waveguides. The outputs of the waveguides are coupled to an output slab waveguide 50, which provides for the output of light separated by wavelength into output waveguides 52.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for eliminating warping in the manufacture of optical waveguides built upon a wafer, comprising the steps of:

buildup of a first cladding layer on the top side of the wafer;

depositing a layer of core material on top of the cladding layer;

depositing a layer of the core material in the bottom side of the wafer;

annealing the deposited layers;

etching away unwanted core material to provide a patterned core and to expose a portion of the surface of the first cladding layer; and, depositing a second layer of cladding over the patterned core and the exposed surface of the first cladding layer, whereby stress induced during annealing of the deposited core material is countered by stress induced by the annealing of the material deposited on the bottom side of the wafer.

2. The method of claim 1, wherein the material deposited on the bottom side of the wafer is the same as the material deposited on the top side of the first cladding layer.

3. The method of claim 2, wherein the core material includes silicon oxynitride.

4. The method of claim 1, wherein the deposited layer of core material is 1.5 microns thick.

5. The method of claim 4, wherein the layer of material deposited on the bottom of the wafer is 1.5 microns thick.

6. The method of claim 1, wherein the thicknesses of the deposited layers are equal.

7. The method of claim 1, wherein the deposited materials, and thicknesses of the deposited materials are such as to cause compensation of the annealing stresses in the wafer.

8. A method for maintaining the flatness of a wafer used in the fabrication of an optical waveguide thereon, comprising the step of:

depositing on the top and bottom sides of the wafer material which when annealed causes compensating stresses in the wafer such that the wafer remains flat and unwarped after annealing.

9. The method of claim 8, wherein the thicknesses of the deposited material results in the stress compensation.

10. The method of claim 8, wherein the material used in the deposition results in the stress compensation.

11. The method of claim 8, wherein the deposited materials and the thicknesses thereof are equal.

12. A method for assuring that a wafer onto which an optical waveguide is built is flat enough after the annealing of a waveguide core thereon to be successfully vacuum chucked in a stepper, comprising the steps of:

building up a first cladding layer on the top side of the wafer;

depositing a layer of core material on top of the first cladding layer;

depositing a layer of the core material in the bottom side of the wafer;

annealing the deposited layers;

etching away unwanted core material to provide a patterned core and to expose a portion of the surface of the first cladding layer; and, depositing a second layer of cladding over the patterned core and the exposed surface of the first cladding layer, whereby stress induced during annealing of the deposited core material is countered by stress induced by the annealing of the material deposited on the bottom side of the wafer so as to provide a flat wafer underside for the vacuum chuck in the stepper.

13. A method for assuring that a wafer onto which an optical waveguide is built is flat enough after the annealing of a waveguide core thereon to be successfully vacuum-chucked in a stepper, comprising the steps of:

depositing a layer of the core material on opposite sides of the wafer; and, annealing the wafer, whereby warpage due to the annealing is minimized.

14. The method of claim 13, wherein the thickness of the layers is identical.

15. The method of claim 13, wherein the deposed layer of core materials includes silicon oxynitride.

16. A method for assuring the dimensional accuracy of an optical waveguide built up on a wafer, comprising the steps of:

building up a first cladding layer on the top side of the wafer;

depositing the core material on top of the first cladding layer and on the bottom of the wafer;

annealing the deposited layers;

masking and etching the core material on top of the first cladding layer, the masking and etching being unaffected by the annealing due to wafer stress cancellation; and, building up a second cladding layer on top of the core material left after the etching and over the surface of the first cladding layer exposed during the etching.

17. The method of claim 16, wherein the deposited material on the first cladding layer is of the same thickness as on the bottom of the wafer.

18. The method of claim 16, wherein the core material includes silicon oxynitride.

* * * * *